United States Patent
Bossard

(10) Patent No.: US 9,884,761 B2
(45) Date of Patent: Feb. 6, 2018

(54) UNIT FOR REMOVING CONTAMINANTS FROM HYDROGEN GAS AND ISOTOPES OF HYDROGEN GAS WITH FEATURES THAT RESIST DAMAGE FROM REPEATING THERMAL CYCLES

(71) Applicant: Power & Energy, Inc., Ivyland, PA (US)

(72) Inventor: Peter R. Bossard, Ivyland, PA (US)

(73) Assignee: Power & Energy, Inc., Ivyland, PA (US)

( * ) Notice: Subject to any disclaimer, the term of this patent is extended or adjusted under 35 U.S.C. 154(b) by 335 days.

(21) Appl. No.: 14/956,325

(22) Filed: Dec. 1, 2015

(65) Prior Publication Data

US 2016/0151737 A1    Jun. 2, 2016

Related U.S. Application Data

(60) Provisional application No. 62/085,694, filed on Dec. 1, 2014.

(51) Int. Cl.
  *B01D 53/22* (2006.01)
  *B01D 63/06* (2006.01)
  *C01B 3/50* (2006.01)

(52) U.S. Cl.
  CPC ............ *C01B 3/505* (2013.01); *B01D 53/228* (2013.01); *B01D 63/06* (2013.01); *B01D 2053/223* (2013.01); *B01D 2255/104* (2013.01); *B01D 2255/1023* (2013.01); *B01D 2255/20761* (2013.01); *B01D 2256/16* (2013.01); *B01D 2257/102* (2013.01); *B01D 2257/104* (2013.01); *B01D 2257/504* (2013.01); *Y02C 10/10* (2013.01); *Y02P 20/152* (2015.11)

(58) Field of Classification Search
  CPC .............................. B01D 53/22; B01D 53/228; B01D 2053/223; B01D 63/06; B01D 2256/16; C01B 3/503; C01B 3/505
  See application file for complete search history.

(56) References Cited

U.S. PATENT DOCUMENTS

| | | | |
|---|---|---|---|
| 6,174,490 B1 * | 1/2001 | Brinkman | B01D 53/22 264/629 |
| 6,569,226 B1 * | 5/2003 | Dorris | B01D 53/228 95/56 |
| 7,396,385 B1 * | 7/2008 | Bossard | B01D 53/22 95/45 |
| 8,002,875 B1 * | 8/2011 | Bossard | B01D 53/22 95/55 |
| 9,169,118 B1 * | 10/2015 | Bossard | B01D 63/062 |

(Continued)

*Primary Examiner* — Jason M Greene
(74) *Attorney, Agent, or Firm* — LaMorte & Associates P.C.

(57) ABSTRACT

A hydrogen separator having a first end plate, a second end plate, and a cylindrical support extending from the second end plate. A permeable tube support plate is suspended by the cylindrical support, wherein the second end plate, cylindrical support and permeable tube support plate define a collection chamber. A hydrogen permeable tube is coupled to the permeable tube support plate. A housing surrounds the cylindrical support. An exhaust tube support plate is within the housing and external of the collection chamber, wherein an exhaust chamber is defined between the exhaust tube support plate and the first end plate.

15 Claims, 3 Drawing Sheets

(56) References Cited

U.S. PATENT DOCUMENTS

| | | | | |
|---|---|---|---|---|
| 2004/0003715 A1* | 1/2004 | Bossard | ............... | B01D 53/22 95/56 |
| 2007/0107596 A1* | 5/2007 | Wynn | ............... | B01D 53/22 96/4 |
| 2008/0163753 A1* | 7/2008 | Bossard | ............... | B01D 53/22 95/55 |
| 2013/0213228 A1* | 8/2013 | Ikeda | ............... | B01D 53/22 95/55 |

* cited by examiner

UNIT FOR REMOVING CONTAMINANTS FROM HYDROGEN GAS AND ISOTOPES OF HYDROGEN GAS WITH FEATURES THAT RESIST DAMAGE FROM REPEATING THERMAL CYCLES

RELATED APPLICATIONS

This application claims priority of provisional patent application No. 62/085,694, filed Dec. 1, 2014.

BACKGROUND OF THE INVENTION

1. Field of the Invention

In general, the present invention relates to units that are used to purify hydrogen gas and isotopes of hydrogen gas in a fuel clean-up system of a nuclear reactor.

2. Prior Art Description

Nuclear fusion reactors produce various wastes as they operate. One such waste is the plasma exhaust. The plasma exhaust contains highly valuable hydrogen isotopes in addition to hydrogen and a variety of contaminants, such as oxygen, nitrogen, and carbon dioxide. Nuclear facilities use clean-up systems to recycle the hydrogen isotopes.

One widely used method of reclaiming hydrogen isotopes is through cryogenic rectification. However, the effectiveness of the cryogenic rectification can be improved if the impurities are separated from the hydrogen and the hydrogen isotopes. The removal of impurities is typically achieved by passing the subject gases through a hydrogen separator. A hydrogen separator contains a hydrogen permeable membrane made from a palladium alloy. The membrane is permeable to hydrogen and isotopes of hydrogen, but is non-permeable to contaminants. Thus, as the hydrogen and hydrogen isotopes pass through the hydrogen permeable membrane, these gases are separated from contaminants.

One of the most effective hydrogen separators available is the micro-channel separator manufactured by Power+Energy, Inc. of Ivyland, Pa. The workings of this separator are disclosed in U.S. Pat. No. 7,396,385 and its progeny. However, such hydrogen separators are not specifically designed for use in nuclear reactor clean-up subsystems. In such subsystems, there are extreme temperature fluctuations as the subsystems are brought on and off line. Such temperature fluctuations can cause slight deflections in the structure of a traditional hydrogen separator that can reduce its effectiveness and compromise its integrity over time. Any possible compromise of integrity is unacceptable when applied to a subsystem of a nuclear reactor.

A need therefore exists for an improved hydrogen separator that is better designed for use in a nuclear reactor subsystem, wherein the hydrogen separator is more robust and less susceptible to damage from thermal fluctuations. This need is met by the present invention as described and claimed below.

SUMMARY OF THE INVENTION

The present invention is a robust hydrogen separator assembly suitable for use in the reclamation of hydrogen isotopes from the plasma exhaust of a nuclear reactor. The assembly is formed as a unit having a first end plate and a second end plate. A housing extends between the first end plate and the second end plate. Inside the housing is an exhaust tube support plate. The housing has two sections that are divided by the exhaust tube support plate.

A first housing section extends from the first end plate to the exhaust tube support plate. This defines an exhaust chamber within the first housing section between said first end plate and said exhaust tube support plate. The second housing section extends from the second end plate to the exhaust tube support plate. This defines a collection chamber within the second housing section between the second end plate and the exhaust tube support plate.

Hydrogen permeable tubes are provided. The hydrogen permeable tubes have interior and exteriors. The exteriors of the hydrogen permeable tubes are exposed to the collection chamber and the interiors of said hydrogen permeable tubes are exposed to a gas intake port.

Exhaust tubes are provided that extend as cantilevers from the exhaust tube support plate. The exhaust tubes extend into the interiors of the hydrogen permeable tubes. The unit is accessed by various gas ports. An exhaust port accesses the exhaust chamber. A collection port accesses the collection chamber.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention unit can be embodied in many ways, only one exemplary embodiment is shown. This embodiment is selected in order to set forth one of the best modes contemplated for the invention. The illustrated embodiment, however, is merely exemplary and should not be considered a limitation when interpreting the scope of the appended claims.

Figure 1:
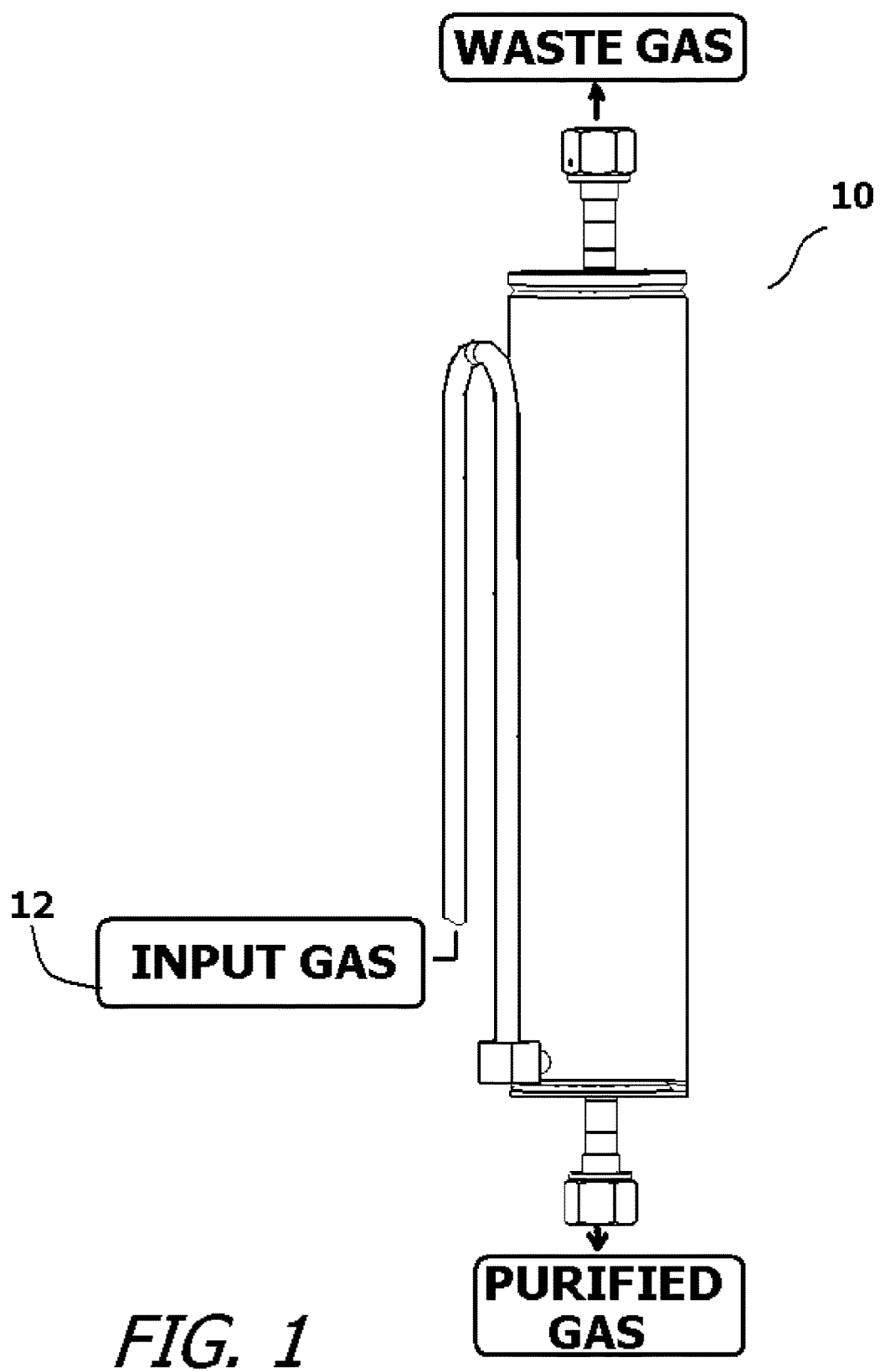
FIG. 1 shows a hydrogen separation unit with indicators of the gas inputs and outputs.

Referring to FIG. 1, an overview of the unit 10 is shown. The unit 10 receives an input gas 12, which is a mixture of hydrogen gas, hydrogen isotopes and various contaminant gases. The purpose of the unit 10 is to separate the hydrogen gas and its isotopes from the various contaminants in an efficient manner. This separation is performed by the unit either with or without the use of an inert sweep gas, such as helium.

The unit 10 runs at temperatures in excess of 300 degrees Celsius. The various gas tubes used to lead gases into and away from the unit 10 can be curved and otherwise shaped to preheat the gases leading into the unit 10 and cool the gases exiting the unit 10. However, the unit 10 is often turned off, wherein it returns to ambient temperature. The cycling of temperatures creates thermal stresses in the unit 10 that can cause malfunctions over time. The unit 10 has an enhanced design that minimizes the effects of thermal cycling, therein producing a more reliable and robust unit.

Figure 2:
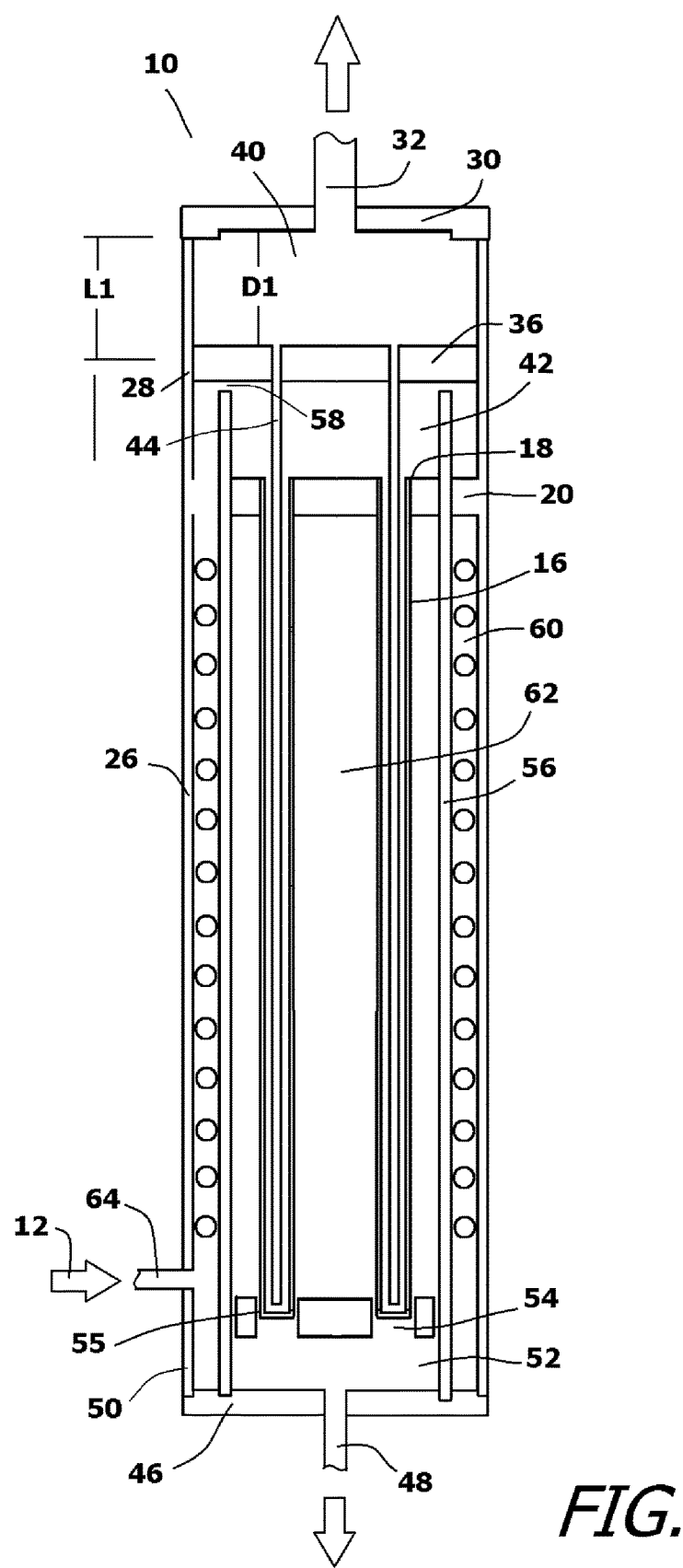
FIG. 2 is a cross-sectional view of an exemplary embodiment of a hydrogen separator unit.
Figure 3:
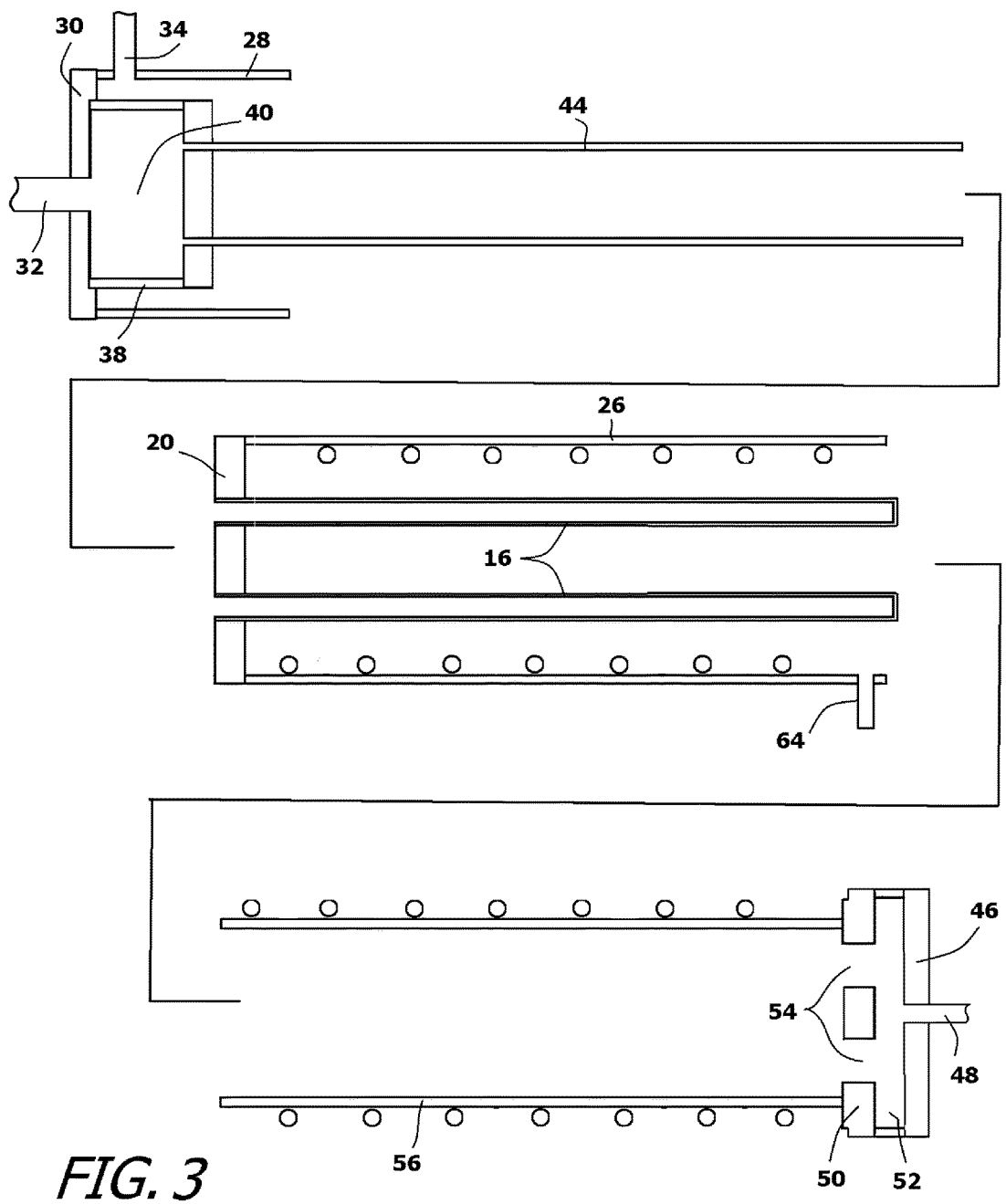
FIG. 3 is an exploded, cross-sectional view of the embodiment of FIG. 2.

Referring to FIG. 2 and FIG. 3 in conjunction with FIG. 1, it can be seen that a matrix of hydrogen permeable tubes 16 is provided. The hydrogen permeable tubes 16 are preferably fabricated from a palladium alloy, such a palladium silver alloy or a palladium copper alloy. Although only two hydrogen permeable tubes 16 are illustrated, it should be understood that dozens or hundreds of such hydrogen permeable tubes can be manufactured into a single unit.

Each of the hydrogen permeable tubes 16 has a first open end 18 that is brazed to a hole in a tube support plate 20. The first open end 18 leads to an interior of each hydrogen permeable tube 16. The second ends 22 of the hydrogen permeable tubes 16 are sealed. The hydrogen permeable tubes 16 extend as cantilevers from the tube support plate 20. The hydrogen permeable tubes 16 touch no other objects. As such, each of the hydrogen permeable tubes 16 is free to expand and contract with changes in temperature, without causing any significant stresses in the structure of the hydrogen permeable tubes 16.

The housing of the unit 10 has a lower tube section 26 and an upper tube section 28. The lower tube section 26 and the upper tube section 28 are concentrically aligned and are joined together at an exhaust tube support plate 36. The upper tube section 28 has a length L1. The upper tube section 28 is covered in a top end plate 30. An exhaust port 32 is formed through the top end plate 30.

The exhaust tube support plate 36 is a distance D1 from the top end plate 30. An exhaust chamber 40 is disposed between the top end plate 30 and the exhaust tube support plate 36. The exhaust port 32 communicates with the exhaust chamber 40.

Holes are formed in the exhaust tube support plate 36. Exhaust tubes 44 are welded to the holes. The exhaust tubes 44 are preferably made of stainless steel or another metal that does not react with hydrogen. The exhaust tubes 44 are open to the exhaust chamber 40. The exhaust tubes 44 extend as cantilevers down into the hydrogen permeable tubes 16.

A bottom end plate 46 seals the bottom of the lower tube section 26. A collection port 48 extends through the bottom end plate 46. A third support plate 50 is positioned within the lower tube section 26 near the bottom end plate 46. The area between the third support plate 50 and the bottom end plate 46 defines an output chamber 52. The collection port 48 communicates with the output chamber 52.

Openings 54 are formed in the third support plate 50. The hydrogen permeable tubes 16 pass into the openings 54 without touching the third support plate 50. The hydrogen permeable tubes 16 extend into the openings 54 but not beyond the openings 54. As such, the presence of the hydrogen permeable tubes 16 partially obstructs each of the openings 54. This leaves small flow gaps 55 that control the flow rate of gases across the third support plate 50.

An inner tubular element 56 extends upwardly from the bottom end plate 46. The length of the inner tubular element 56 approaches the exhaust tube support plate 36, but is shy, therein leaving a gap space 58 between the inner tubular element 56 and the exhaust tube support plate 36. The tube support plate 20 is attached to the interior of the inner tubular element 56. As such, the inner tubular element 56 supports the tube support plate 20 and the hydrogen permeable tubes 16 that extend from the tube support plate 20. The space between the tube support plate 20 and the exhaust tube support plate 36 creates a supply chamber 42. The supply chamber 42 communicates with the open tops 18 of the hydrogen permeable tubes 16.

The inner tubular element 56 divides the area within the lower tube section 26 into two concentric chambers. They include an outer chamber 60 and an inner chamber 62. The outer chamber 60 communicates with the supply chamber 42. The outer chamber 60 is disposed between the inner tubular element 56 and the lower tube section 26. The inner chamber 62 is within the inner tubular element 56. The hydrogen permeable tubes 16 extend through the inner chamber 62. An intake port 64 communicates with the outer chamber 60.

Two helical coils are provided. The helical coils includes a first coil that is affixed to the lower tube section 26 and a second coil that is affixed to the exterior of the inner tube element 56. The two helical coils interlace during assembly so as to become interposed between the lower tube section 26 and the inner tube element 56 within the outer chamber 60. The two coils combine to create a helical baffle.

In operation, the unit 10 is heated to its operating temperature. Input gas 12 enters the outer chamber 60 through the intake port 64. The input gas 12 passes through the helical baffles, wherein the input gas 12 is heated. The input gas 12 flows across the gap space 58 and into the supply chamber 42. Once in the supply chamber 42, the input gas 12 flows through the open tops 18 of the hydrogen permeable tubes 16. The input gas 12 then flows into the gap space between the hydrogen permeable tubes 16 and the exhaust tubes 44. This gap space is very small, therein inducing any hydrogen gas contained within the input gas 12 to pass through the hydrogen permeable tubes 16. The contaminants remain and flow into the exhaust chamber 40. The exhaust chamber 40 vents waste gas through the exhaust port 32.

The hydrogen gas that permeates through the hydrogen permeable tubes 16 is collected within the inner chamber 62. The hydrogen gas passes through the gaps in the third support plate 50 and exits the unit 10 through the collection port 48. To reduce the partial pressure of hydrogen gas in the inner chamber 62, the inner chamber 62 can be swept by an inert sweep gas, wherein the inert sweep gas would move any collecting hydrogen gas to the output chamber 52.

As the unit 10 cycles between its operating temperature and ambient temperature, the various components expand and contract. These thermal cycles causes fatigue in the various components. In particular, the hydrogen permeable tubes 16 are particularly susceptible to damage from the stresses of thermal cycling.

The structure of the unit 10 is designed to minimize thermal stresses that act upon the hydrogen permeable tubes 16. The hydrogen permeable tubes 16 are attached as cantilevers to the tube support plate 20. No other strictures physically touch the hydrogen permeable tubes 16. As such, the hydrogen permeable tubes 16 are free to expand and contract along its entire length beyond the tube support plate 20. The hydrogen permeable tubes 16 extend into the openings 54 of the third support plate 50 but not beyond the openings 54. This protects the bottom ends 22 of the hydrogen permeable tubes 16 from damage should the bottom of the unit 10 buckle or dent from being dropped.

The exhaust tubes 44 extend inside the hydrogen permeable tubes 16. The exhaust tubes 44 extend as cantilevers from the exhaust tube support plate 36. The supply tubes 44 are symmetrically affixed to the exhaust tube support plate 36. As such, they remain straight and parallel as the exhaust tube support plate 36 expands with heat. Furthermore, the exhaust tube support plate 36 is suspended from a cylindrical wall that is uniformly round. As such, it does not cause any tilting of the exhaust tube support plate 36 as it heats and cools.

As the exhaust tubes 44 heat, they elongate. This moves the exhaust tubes 44 deeper into the hydrogen permeable tubes 16. However, the upper tube section 28 also elongates. This lengthens the length L1 and pulls the exhaust tubes 44 out of the hydrogen permeable tubes 16. The net movement is close to zero. Thus, as temperatures change, the exhaust tubes 44 remain relatively stationary within the hydrogen permeable tubes 16.

It will be understood that the embodiment of the present invention that is illustrated and described is merely exemplary and that a person skilled in the art can make many variations to that embodiment. All such embodiments are intended to be included within the scope of the present invention as defined by the appended claims.

What is claimed is:

1. A hydrogen separator assembly, comprising:
a first end plate;
a second end plate;
an exhaust tube support plate;
a first housing section that extends from said first end plate to said exhaust tube support plate, therein defining a exhaust chamber within said first housing section between said first end plate and said exhaust tube support plate;
a second housing section that extends from said second end plate to said exhaust tube support plate, therein defining a collection chamber within said second housing section between said second end plate and said exhaust tube support plate;
a permeable tube support plate;
a support that extends from said second end plate and supports said permeable tube support plate within said second housing section;
hydrogen permeable tubes that extend as cantilevers from said permeable tube support plate, said hydrogen permeable tubes having interiors and exteriors, wherein said exteriors of said hydrogen permeable tubes are exposed to said collection chamber and said interiors of said hydrogen permeable tubes are exposed to an intake port;
exhaust tubes that extend as cantilevers from said exhaust tube support plate and into said interiors of said hydrogen permeable tubes;
an exhaust port that is exposed to said exhaust chamber; and
a collection port that is exposed to said collection chamber.

2. The assembly according to claim 1, wherein said support is a cylindrical structure that surrounds said hydrogen permeable tubes.

3. The assembly according to claim 2, wherein a space exists between said support and said second housing section, wherein said space communicates with said intake port.

4. The assembly according to claim 3, further including baffles in said space that baffle gas flow between said intake port and said hydrogen permeable tubes.

5. The assembly according to claim 1, further including a third support plate disposed within said collection chamber, wherein said third support plate defines openings through which said hydrogen permeable tubes extend, therein creating flow gaps within said openings around said hydrogen permeable tubes.

6. A hydrogen separator assembly, comprising:
a first end plate;
a second end plate;
a cylindrical support extending from said second end plate;
a permeable tube support plate suspended by said cylindrical support, wherein said second end plate, said cylindrical support and said permeable tube support plate define a collection chamber;
a hydrogen permeable tube coupled to said permeable tube support plate that extends into said collection chamber;
a housing that extends from said first end plate to said second end plate, wherein said housing surrounds said cylindrical support;
a exhaust tube support plate within said housing and external of said collection chamber, wherein an exhaust chamber is defined within said housing between said exhaust tube support plate and said first end plate; and
an exhaust tube that extends from said exhaust tube support plate into said hydrogen permeable tube.

7. The assembly according to claim 6, wherein said exhaust tube extends as a cantilever from said exhaust tube support plate.

8. The assembly according to claim 6, wherein said hydrogen permeable tube extends as a cantilever from said permeable tube support plate.

9. The assembly according to claim 6, wherein a space exists between said cylindrical support and said housing.

10. The assembly according to claim 6, further including an intake port, wherein said space and said hydrogen permeable tube are exposed to gases received into said housing through said intake port.

11. The assembly according to claim 10, further including baffles in said space that baffle gas flow between said intake port and said hydrogen permeable tube.

12. The assembly according to claim 6, further including a third support plate disposed within said collection chamber, wherein said third support plate defines openings through which said hydrogen permeable tube extends, therein creating flow gaps within said openings around said hydrogen permeable tube.

13. A hydrogen separator assembly, comprising:
an end plate;
a first support plate;
a collection chamber disposed between said first end plate and said first support plate;
a hydrogen permeable tube that extends as a cantilever from said first support plate into said collection chamber;
a housing that surrounds said collection chamber, wherein said housing is coupled to said end plate, and wherein a space exists between said collection chamber and said housing;
an exhaust tube support plate within said housing and external of said collection chamber; and
an exhaust tube that extends from said exhaust tube support plate into said hydrogen permeable tube.

14. The assembly according to claim 13, wherein said exhaust tube extends as a cantilever from said exhaust tube support plate.

15. The assembly according to claim 13, further including an intake port, wherein said space and said hydrogen permeable tube are exposed to gases received into said housing through said intake port.

* * * * *